US010725154B2

(12) United States Patent
Cochenour et al.

(10) Patent No.: US 10,725,154 B2
(45) Date of Patent: *Jul. 28, 2020

(54) OPTICAL DETECTION OF AN OBJECT IN A TURBID MEDIUM USING AN OPTICAL VORTEX

(71) Applicant: United States of America, as represented by the Secretary of the Navy, Patuxent River, MD (US)

(72) Inventors: Brandon Cochenour, Alexandria, VA (US); Lila Rodgers, Fayetteville, NY (US); Alan Edward Laux, Great Mills, MD (US); Linda Mullen, Chesapeake Beach, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 354 days.

This patent is subject to a terminal disclaimer.

(21) Appl. No.: 15/923,016

(22) Filed: Mar. 16, 2018

(65) Prior Publication Data

US 2019/0285731 A1 Sep. 19, 2019

(51) Int. Cl.
| | |
|---|---|
| *G01S 7/00* | (2006.01) |
| *G01S 7/48* | (2006.01) |
| *G01S 7/4865* | (2020.01) |
| *G01S 17/10* | (2020.01) |
| *G01S 7/4861* | (2020.01) |
| *G01S 7/484* | (2006.01) |

(52) U.S. Cl.
CPC ............ *G01S 7/4808* (2013.01); *G01S 7/484* (2013.01); *G01S 7/4861* (2013.01); *G01S 7/4865* (2013.01); *G01S 17/10* (2013.01)

(58) Field of Classification Search
USPC ............................................... 356/4.01, 5.01
See application file for complete search history.

(56) References Cited

U.S. PATENT DOCUMENTS

| | | | | |
|---|---|---|---|---|
| 5,822,047 | A * | 10/1998 | Contarino | G01S 7/484 356/5.01 |
| 6,437,904 | B1 * | 8/2002 | Reeder | G02F 1/0136 359/246 |
| 10,634,790 | B2 * | 4/2020 | Mullen | G01S 17/26 |

(Continued)

OTHER PUBLICATIONS

Jantzi, et al, Enhanced Underwater Ranging Using an Optical Vortex, Optics Express, Jan. 25, 2018, vol. 26, No. 3.

(Continued)

*Primary Examiner* — James R Hulka
(74) *Attorney, Agent, or Firm* — Mark. O. Glut; Olivia R. Scheur; NAWCAD

(57) ABSTRACT

A method and system for imaging in degraded visual environments. The system includes a laser that is positioned to transmit a Gaussian beam toward a target object located within the degraded visual environment. An optical receiver is positioned to receive return signals. A helical phase element is positioned between the target object and the optical receiver. The return signals pass through the helical phase element. The helical phase element separates coherent and incoherent light by imparting orbital angular momentum on the coherent returns to form an optical vortex.

15 Claims, 3 Drawing Sheets

(56) References Cited

U.S. PATENT DOCUMENTS

2015/0303645 A1* 10/2015 Palese .................... G02B 27/10
                                                          359/341.1
2017/0163451 A1*  6/2017 Willner ............. H04L 25/03891
2018/0034556 A1*  2/2018 Willner .................. H04B 10/70
2018/0203121 A1*  7/2018 Mullen ................... G01S 17/26

OTHER PUBLICATIONS

Cochenour, et al, The Detection of Objects in a Turbid Underwater Medium Using Orbital Angular Momentum (OAM), SPIE, Aug. 2017, vol. 10186.

* cited by examiner

OPTICAL DETECTION OF AN OBJECT IN A TURBID MEDIUM USING AN OPTICAL VORTEX

STATEMENT OF GOVERNMENT INTEREST

The invention described herein may be manufactured and used by or for the Government of the United States of America for governmental purposes without payment of any royalties thereon or therefor.

BACKGROUND

Light Detection and Ranging (LIDAR) is a remote sensing method in which lasers are used to probe, range, or image a scene. LIDAR works by transmitting laser light toward an object in a medium. The laser light is reflected off the object and the reflected signal is captured by a photodetector. The detected reflection is processed and used to create an image of the target object.

In degraded visual environments (e.g., fog, smoke, haze, turbid water, etc.), the accuracy of standard LIDAR systems diminish as the visibility of the target object is reduced due to the collection of scattered light. Backscattered light from the environment, having never reached the object of interest, reduces image contrast and increases receiver noise. In the direction of propagation, small-angle forward scattered light broadens the interrogating beam in space and time, leading to reductions in both spatial and range resolution. Depending on the severity, the interrogating beam may be spatially dispersed enough to illuminate parts of the scene outside of the area of interest, further degrading resolution.

Advances have been made in LIDAR imaging to compensate for the decreased contrast and loss of resolution caused by optical scattering by particles in the medium. The simplest approach modifies the system geometry. Increasing the separation distance between transmitter and receiver can reduce backscatter clutter—at the cost of a larger system size—and a reduced receiver field of view can limit forward scatter clutter—at the cost of reduced signal level. Alternatively, the temporal properties of the laser pulse can be exploited to selectively process only the reflections from the target object, for example through receiver gating. This helps reduce backscatter, but makes the system blind to nearby targets since the receiver is gated off until the anticipated arrival of longer range returns. Furthermore, receiver gating cannot discriminate against forward scatter. In another variation, an intensity modulated beam—or an intensity modulated pulse—has been shown to effectively reduce both backward and forward scatter. Currently however, this approach requires large and complex laser sources.

SUMMARY

In general, in one aspect, a method and system for detection, ranging, or imaging in degraded visual environments, the system comprising: a laser, positioned to transmit a continuous, pulsed, or modulated Gaussian beam toward a target object located within a degraded visual environment; an optical receiver, positioned to receive one or more return signals; and a helical phase element, positioned between the target object and the optical receiver, wherein the one or more return signals pass through the helical phase element. In response to signals passing through the helical phase element, the one or more return signals create an optical vortex detected by the photodetector, wherein an incoherent signal is filtered from the one or more return signals to detect the target object within the degraded visual environment.

Unless otherwise defined, all technical and scientific terms used herein have the same meaning as commonly understood by one of ordinary skill in the art to which this invention belongs. Other features and advantages will be apparent from the following detailed description.

DRAWINGS

These and other features, aspects and advantages of the present invention will become better understood with reference to the following description and appended claims, and accompanying drawings wherein:

DETAILED DESCRIPTION

Embodiments of the present invention recognize that the image quality of LIDAR systems is degraded, especially in turbid media. Embodiments of the present invention utilize novel techniques exploiting orbital angular momentum to improve the contrast and/or resolution of an active optical system in degraded visual environments. Orbital angular momentum is a property of light that describes the helical dependence of the optical phase front, which results in an intensity vortex. Embodiments of the present invention use an optical vortex to analyze the spatial coherence of the received light from a scene. The present invention provides a method for differentiating spatially coherent target-reflected light from spatially incoherent scatter in degraded visual environments, using the optical vortex.

Some embodiments of the present invention utilize a pulsed laser beam to further increase the accuracy of the detector. The pulsed beam provides a means to further differentiate scattered light in the system. In some embodiments, pulsing the beam is an effective means to discriminate between the light reflected from the target object and from backscattered light.

Some embodiments of the present invention utilize a modulated, or modulated pulse, laser beam to further increase the accuracy of the detector. The modulated beam provides a means to further differentiate scattered light in the system. In some embodiments, modulating the beam is an effective means to discriminate between the light reflected from the target object and from backscattered and forward scattered light.

In the following detailed description, reference is made to the accompanying drawings which are a part of this patent disclosure, and are shown by way of illustration depicting specific embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art.

Figure 1:
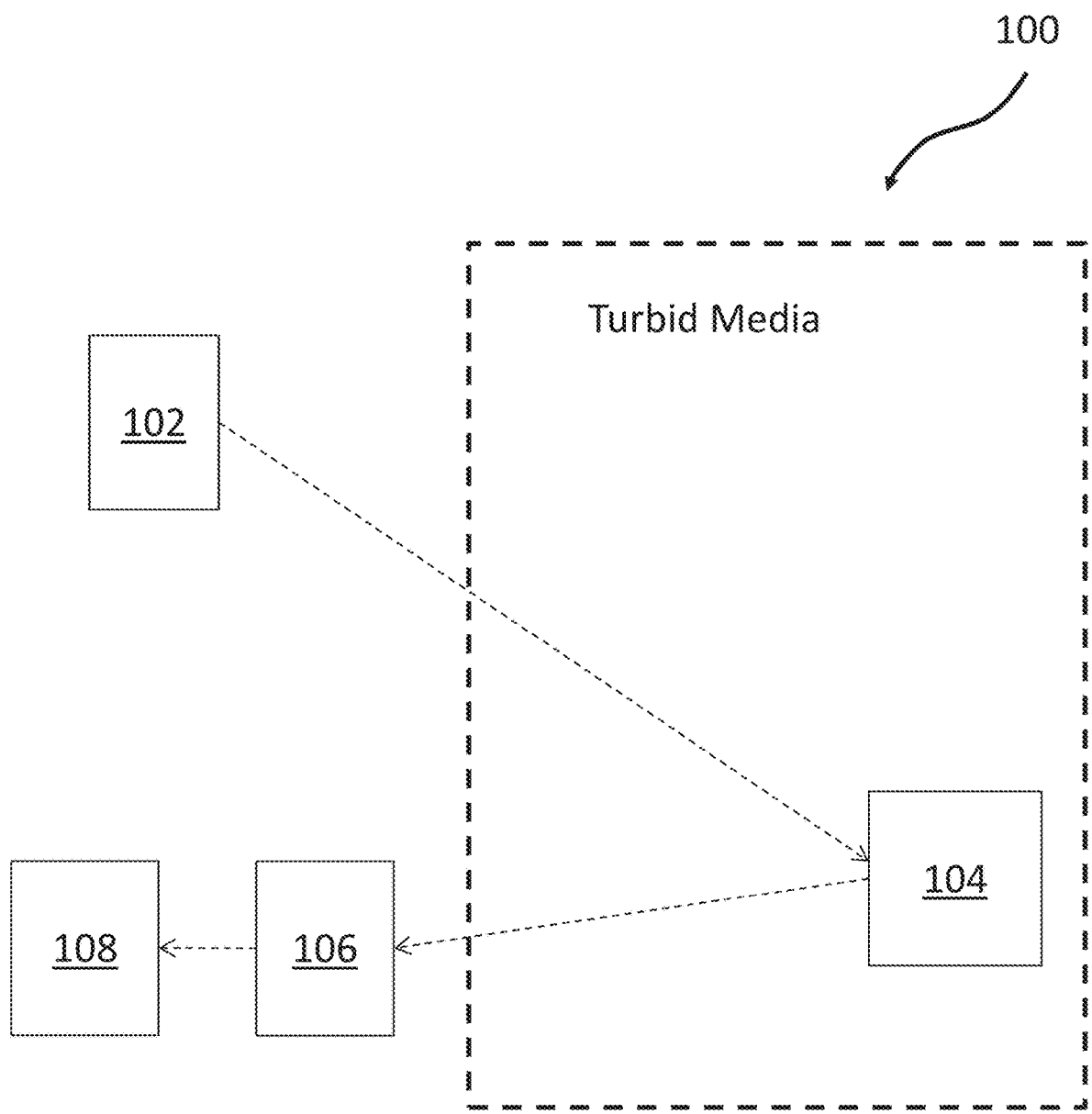
FIG. 1 is a block diagram depicting the optical detection system using an optical vortex.

Turning now to the figures, FIG. 1 is a block diagram depicting the optical detection system using an optical vortex. Optical detection system 100 includes multiple components, including: laser 102, target object 104, helical phase element 106, and photodetector 108.

Target object 104 is located in turbid media. For example, target object 104 is located at the bottom of an ocean. Vision in the turbid media is degraded, such that traditional imaging to systems cannot produce a high-contrast image of target object 104. The turbid media can cause the light to scatter in many directions, interfering with the imaging process. In many embodiments, light directed at target object 104 returns to the system as one of three forms: backscatter, forward scatter, or light reflected from target object 104. Embodiments of the present invention discriminate against the backscatter and forward scatter to provide detection of target object 104 with high contrast and high range resolution.

Laser 102 emits a Gaussian beam. Laser 102 is directed toward target object 104. In some embodiments, laser 102 is transmitted in a pulsed form. In other embodiments, laser 102 is modulated, or a "chirp." The modulation frequency of the chirp can be modified to tune the system.

Helical phase element 106 is an element which imparts a helical phase structure that leads to the formation of a vortex. In some embodiments, helical phase element 106 is a diffractive spiral phase plate. The backscattered light, forward scattered light, and light reflected off target object 104 is passed through helical phase element 106. Spatially coherent light from target object 104, passing through helical phase element 106, creates an optical vortex. Spatially incoherent light from unwanted backward and forward scatter, passing through helical phase element 106, does not form an optical vortex. Thus, helical phase element 106 provides differentiation of spatially coherent and incoherent returns, which is used to discriminate a target object from the environment.

Figure 3:
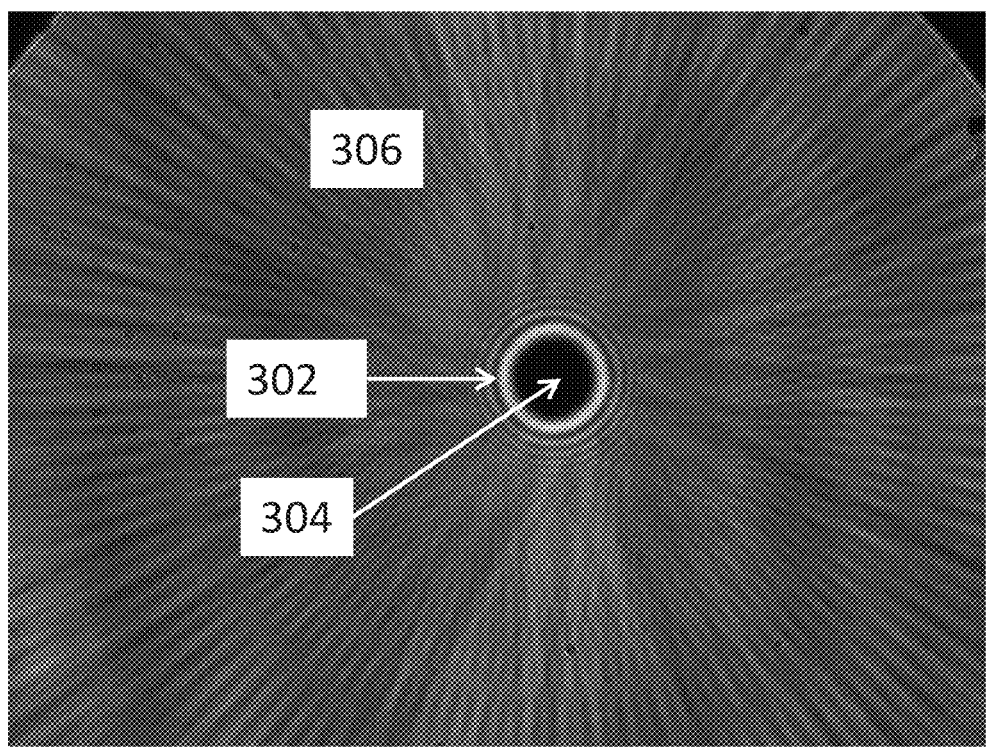
FIG. 3 is an example of an image produced by the photodetector.

Photodetector 108 detects light signals from the turbid media environment. In one embodiment, photodetector is a charge-coupled device (CCD) camera. Photodetector 108 is positioned such that an optical vortex is formed at the center of the photodetector's active area. FIG. 3 is an example of an image produced by photodetector 108 in optical detection system 100. The intensity on photodetector 108 can be analyzed as three regions. The three regions are the vortex 302, the core 304, and the outside 306. In clean water, the vortex region 302 is formed from the spatially coherent component of the target object 104. The intensity of the core 304 is negligible due to the formation of the optical vortex, while the outside region 306 is composed of spatially incoherent light reflected by the target object 104 and arriving at the receiver at larger angles. In a turbid medium, spatially incoherent backscatter and forward scattered are distributed across the entire image. In this case, the intensity of the vortex 302 is the sum of the coherent ballistic reflection of the target object 104 with the backscatter and forward scatter. The intensity in the core 304 is due to backscatter and forward scatter only. By subtracting the core 304 intensity which contains only scattered light from the vortex 302 intensity which contains both scattered light and reflected light from the target object 104, a measurement of the desired target object 104 only can be obtained.

In embodiments utilizing a pulsed laser 102, the pulse can be used to refine the ranging measurements of target object 104. The time of the laser transmission is compared to the time when photodetector 108 receives the return signal. The difference in the times is used to determine the range of target object 104.

Figure 2:
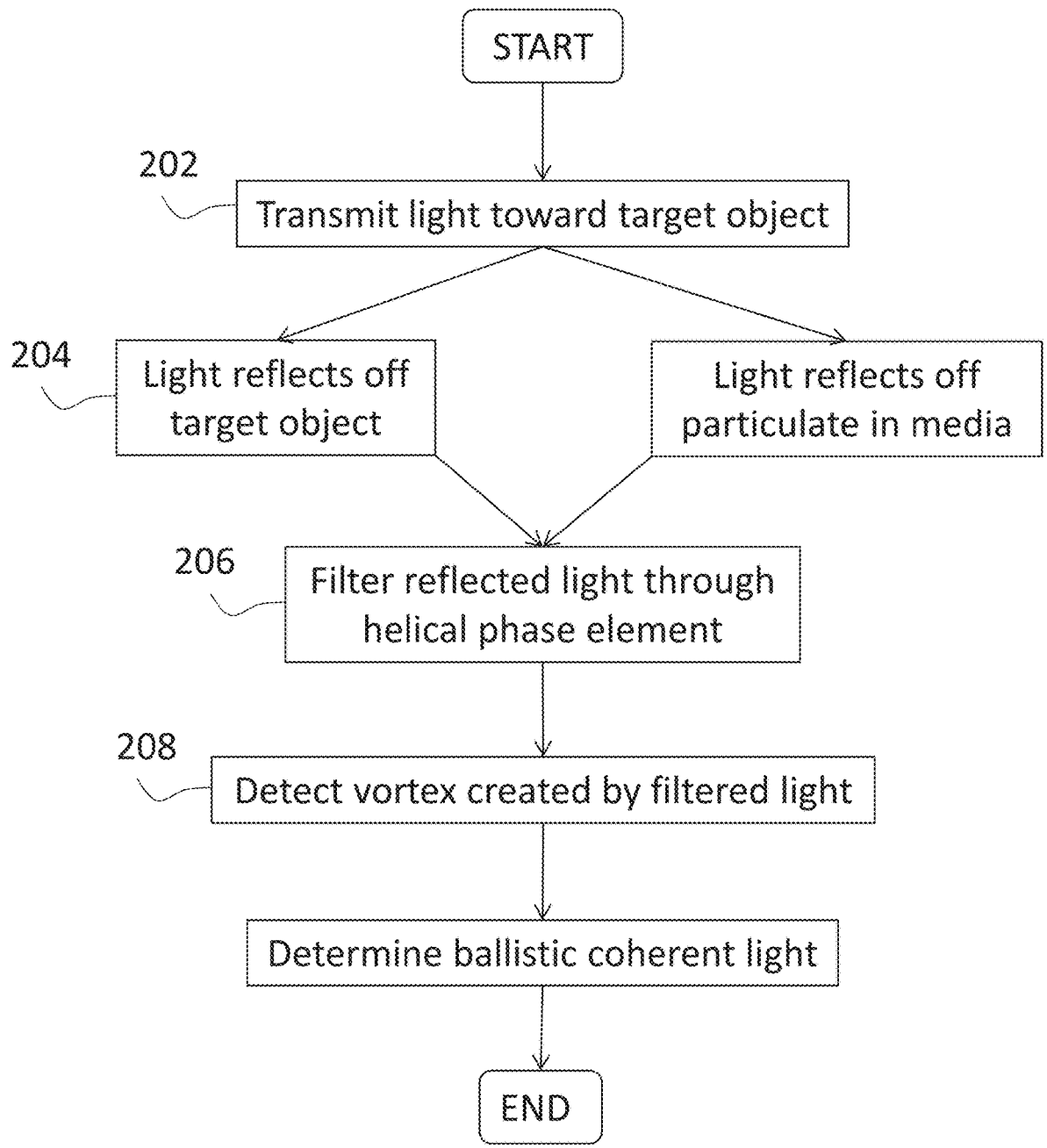
FIG. 2 is a block diagram of the process for optical detection using an optical vortex.

FIG. 2 is a block diagram of the process for optical detection using an optical vortex. One skilled in the art will recognize that functions described in the block diagram may occur out of order noted in the figure. For example, two blocks shown in succession may, in fact, be executed substantially concurrently, depending upon the functionality involved. The process in FIG. 2 uses a spiral phase plate to create an optical vortex, which allows for the differentiation of the spatially coherent and incoherent components of the received optical signal.

In step 202, laser light is transmitted toward a target object. In some embodiments the signal is a Gaussian beam. In some embodiments, the beam may be either continuous, pulsed, or modulated. In some embodiments, the power of the laser light is modified using an attenuator. In step 204, the transmitted signal reflects off the target object. In some instances, the laser light will undergo backscatter and forward scatter. Scatter received by the optical receiver is noise that minimizes the contrast or resolution of the target object image. In step 206, the reflected signal is filtered through a diffractive spiral phase plate to form an optical vortex. In step 208, the signal is received by a photodetector. The measurements received by the photodetector, in the form of the core, vortex, and outside, can be used to determine the ballistic coherent light.

The above description is that of current embodiments of the invention. Various alterations and changes can be made without departing from the spirit and broader aspects of the invention as defined in the appended claims.

What is claimed is:

1. A system for imaging in degraded visual environments, the system comprising:
    a laser, positioned to transmit a Gaussian beam toward a target object located within a degraded visual environment;
    an optical receiver, positioned to receive one or more return signals, wherein the one or more return signals comprise backscatter, forward scatter, coherent light, and incoherent light; and
    a helical phase element, positioned between the target object and the optical receiver, wherein the one or more return signal pass through the helical phase element.

2. The system of claim 1, wherein the helical phase element is a spiral phase plate.

3. The system of claim 1, wherein the helical phase element imparts orbital angular momentum on one or more return signals.

4. The system of claim 1, wherein the helical phase element separates the one or more return signals into three regions including a core, a vortex, and an outside.

5. The system of claim 4, wherein the core comprises the backscatter and forward scatter, and wherein the vortex comprises the backscatter, the forward scatter, and a coherent component of the reflected light signal, and wherein the coherent component of the reflected light signal can be measured by subtracting a measurement of the core from a measurement of the vortex.

6. A method for imaging in degraded visual environment, the method comprising:
    transmitting a Gaussian beam toward a target object;
    receiving, by helical phase element, a reflected light signal from the target object and one or more additional light signals, wherein the one or more additional light signals comprise backscatter, forward scatter, and incoherent light, and wherein the reflected light signal and one or more additional light signals are analyzed by the helical phase element; and
    receiving, by a photodetector, the analyzed reflected light signal and one or more additional light signals.

7. The method of claim 6, further comprising:
    pulsing the Gaussian beam during transmission;

recording a first time, associated with the transmission of the pulsed Gaussian beam;

recording a second time, associated with the received reflected light signal; and comparing the first time to the second time to determine a range of the target object.

8. The method of claim 6, further comprising:

modulating the Gaussian beam during transmission;

recording a first time, associated with the transmission of the modulated Gaussian beam;

recording a second time, associated with the received reflected light signal; and comparing the first time to the second time to determine a range of the target object.

9. The method of claim 6, wherein analyzing comprises:

separating, by the helical phase element, the reflected light signal and the one or more additional light signals into three regions including a core, a vortex, and an outside.

10. The method of claim 9, wherein the core comprises the backscatter and forward scatter, and wherein the vortex comprises the backscatter, the forward scatter, and a coherent component of the reflected light signal, and wherein the coherent component of the reflected light signal can be measured by subtracting a measurement of the core from a measurement of the vortex.

11. A system for imaging in degraded visual environments, the system comprising:

a laser, positioned to transmit a Gaussian beam toward a target object located within a degraded visual environment, wherein the transmission of the Gaussian beam is pulsed;

an optical receiver, positioned to receive one or more return signals, wherein the one or more return signals comprise backscatter, forward scatter, coherent light, and incoherent light; and a helical phase element, positioned between the target object and the optical receiver, wherein the one or more return signal pass through the helical phase element.

12. The system of claim 11, wherein the helical phase element is a spiral phase plate.

13. The system of claim 11, wherein the helical phase element imparts optical angular momentum on one or more return signals.

14. The system of claim 11, wherein the helical phase element separates the one or more return signals into three regions including a core, a vortex, and an outside.

15. The system of claim 14, wherein the core comprises the backscatter and forward scatter, and wherein the vortex comprises the backscatter, the forward scatter, and a coherent component of the reflected light signal, and wherein the coherent component of the reflected light signal can be measured by subtracting a measurement of the core from a measurement of the vortex.

* * * * *